United States Patent [19]

Breed

[11] Patent Number: 4,666,182
[45] Date of Patent: May 19, 1987

[54] NON CRUSH ZONE-ALL MECHANICAL DAMPED SENSOR

[75] Inventor: David S. Breed, Boonton Township, Morris County, N.J.

[73] Assignee: Breed Corporation, Boonton Township, Morris County, N.J.

[21] Appl. No.: 580,336

[22] Filed: Feb. 15, 1984

[51] Int. Cl.⁴ ............................................. B60R 21/32
[52] U.S. Cl. .................................... 280/734; 180/282; 222/5; 280/737
[58] Field of Search ............... 280/734, 735, 737, 736; 222/5; 180/282

[56] References Cited

U.S. PATENT DOCUMENTS

| | | | |
|---|---|---|---|
| 3,749,282 | 7/1973 | Day et al. | 280/734 |
| 3,968,980 | 7/1976 | Hay | 280/734 |
| 4,161,228 | 7/1979 | Svensson et al. | 280/734 |
| 4,204,703 | 5/1980 | Okada | 280/734 |

*Primary Examiner*—Henry A. Bennet
*Attorney, Agent, or Firm*—Kane, Dalsimer, Kane, Sullivan and Kurucz

[57] ABSTRACT

A damped sensor is utilized outside the crush zone of a vehicle. The energy required for release of a firing pin resulting from damped movement of a sensing mass is small in comparison with energy absorbed by a bias spring acting on the sensing mass.

11 Claims, 7 Drawing Figures

FIG.6
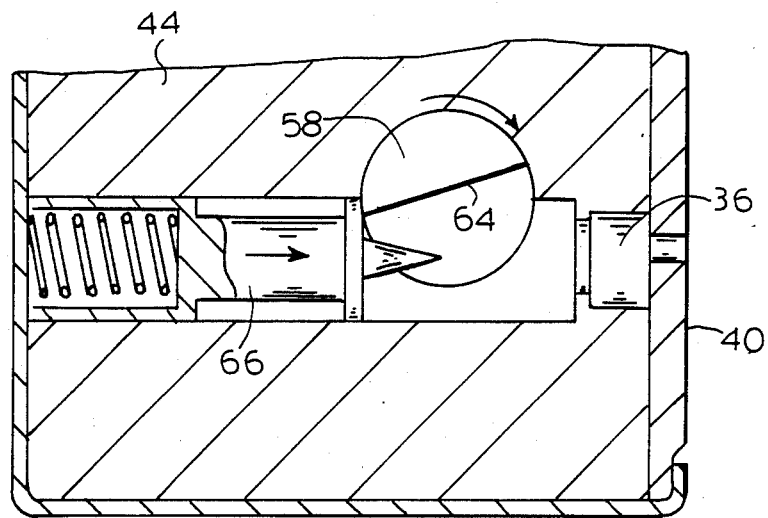
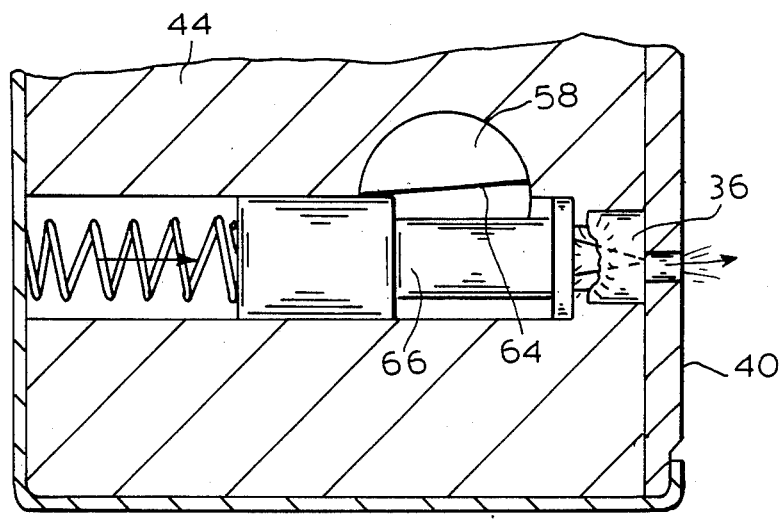
FIG.7

NON CRUSH ZONE-ALL MECHANICAL DAMPED SENSOR

BACKGROUND OF THE INVENTION

Many types of crash sensors have been proposed to be used with passenger restraint systems in automobiles, airplanes and other vehicles. Such passenger restraint systems include automatically retracting seat belts and inflatable air bags. Most crash sensors function to effect the closure of an electrical switch upon sensing a crash of a predetermined severity. When used with inflatable air bags, for example, this switch closure completes a circuit to provide energy to a pyrotechnic element which in some cases opens a bottle of compressed gas or in other cases ignites a pyrotechnic gas generator.

When the sensor is not located forward in the crush zone of a vehicle the energy levels are smaller by a factor of at least 10, so it must be responsive to very low energies.

To date damped mechanical sensors have only been used for sensing automobile crashes in the crush zone or as very sensitive arming or safing sensors on the firewall. There are advantages of using damped sensors outside of the crush zone and in particular in the passenger compartment. These advantages include a substantial system cost reduction and increase in system reliability. In the case of forward sensors, triggering is preferably caused by a velocity change which is relatively independent of the duration of the impact, whereas for non-crush zone sensors, the velocity change required to trigger the sensor varies significantly as a function of pulse duration. Finally, all mechanical non-crush zone sensors require release mechanisms actuated by very little energy. The difficulty of satisfying these requirements has contributed to the fact that a damped sensor located outside of the crush zone of the car has heretofore not been used to actuate a mass produced air bag restraint system.

The ability to locate crash sensors outside the frontal crush zone, and, preferably, in the passenger compartment, which can rapidly discriminate between crashes that do and do not require air bag deployment results in a substantially simpler air bag system.

SUMMARY OF THE INVENTION

It is a principal object of this invention to provide such a sensor having the foregoing attributes and advantages.

A further object of the present invention is to deploy two damped sensors for redundancy and therefore greater reliability of the system deployment.

Another object is to provide a locking or safety system with the foregoing sensor which prevents deployment until the air bag system is mounted on the vehicle.

Another important object is to provide a "D-shaft" arrangement in a sensor of the foregoing type and which permits the release of a firing pin when the proper crash pulse is sensed.

This invention provides a damped sensor for use outside the crush zone of a vehicle or in other words a non-crush zone sensor which includes means for releasing the initiating means (firing pin) and wherein the energy required for this release is small in comparison with the energy absorbed by the bias spring.

BRIEF DESCRIPTION OF THE DRAWINGS

FIG. 6 is an enlarged fragmentary view of the firing pin held in a retracted position by the D shaft; and FIG. 7 is a similar view with the firing pin released when a collision is experienced.

DETAILED DESCRIPTION

Figure 1:
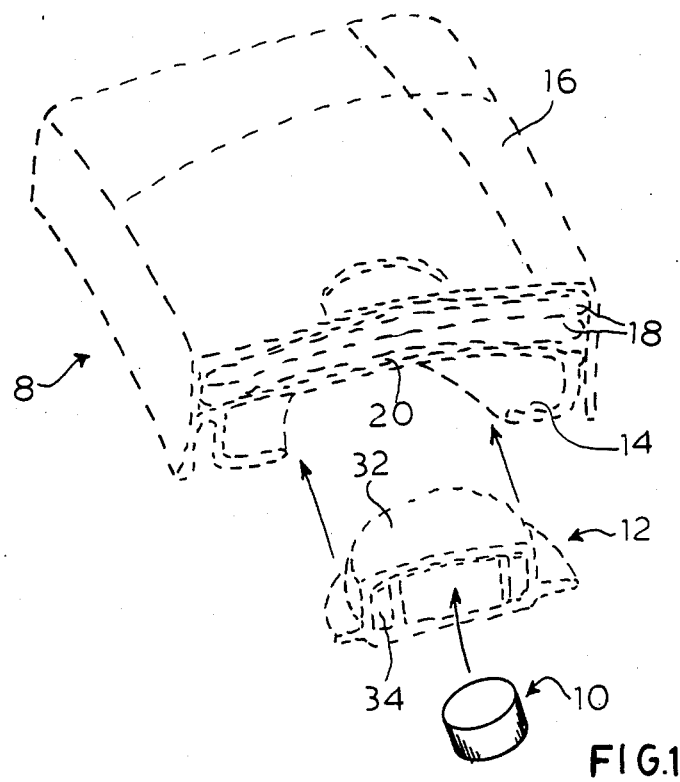
FIG. 1 is a perspective view of a sensor-initiator of this invention with an associated gas generator and folded bag assembly shown in phantom, and mounted within the vehicle passenger compartment.
Figure 5:
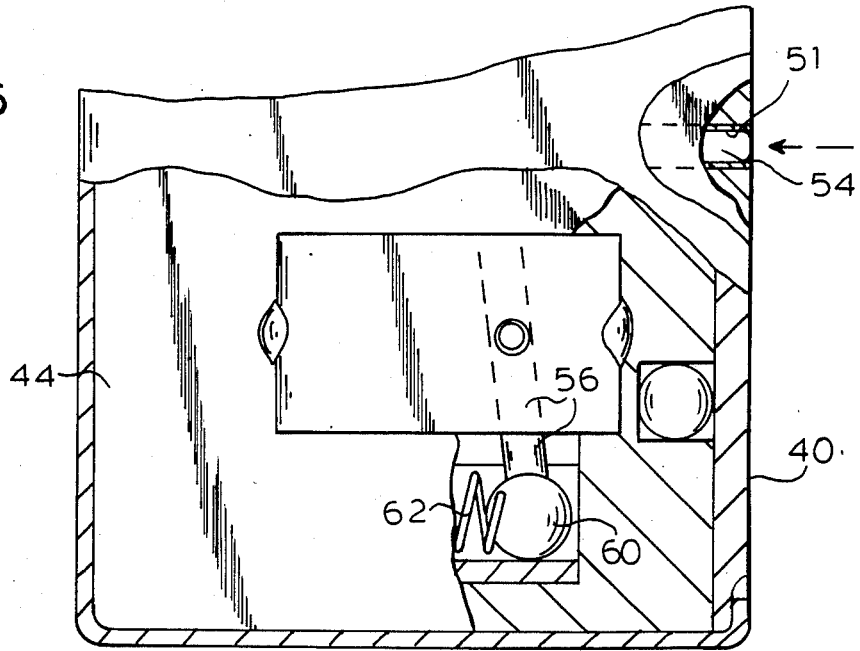
FIG. 5 is an enlarged fragmentary view including the end of the D-shaft and mounting plate supporting the D-shaft.
Figure 2:
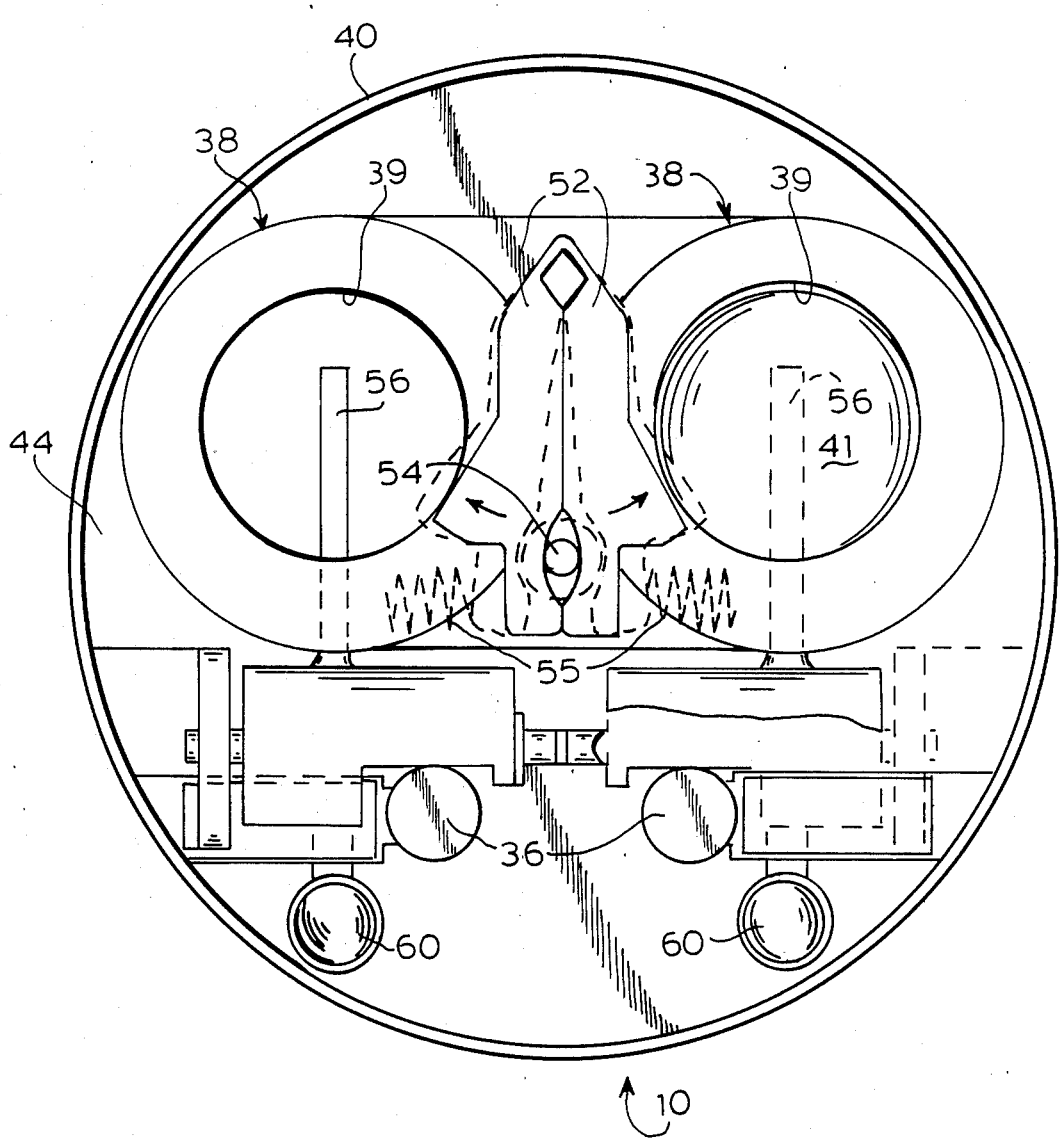
FIG. 2 is a top plan view of the sensor with the cover removed and other parts broken away and removed, showing the sensor armed with dash lines depicting the position of the locking arms when the sensor is safe.
Figure 3:
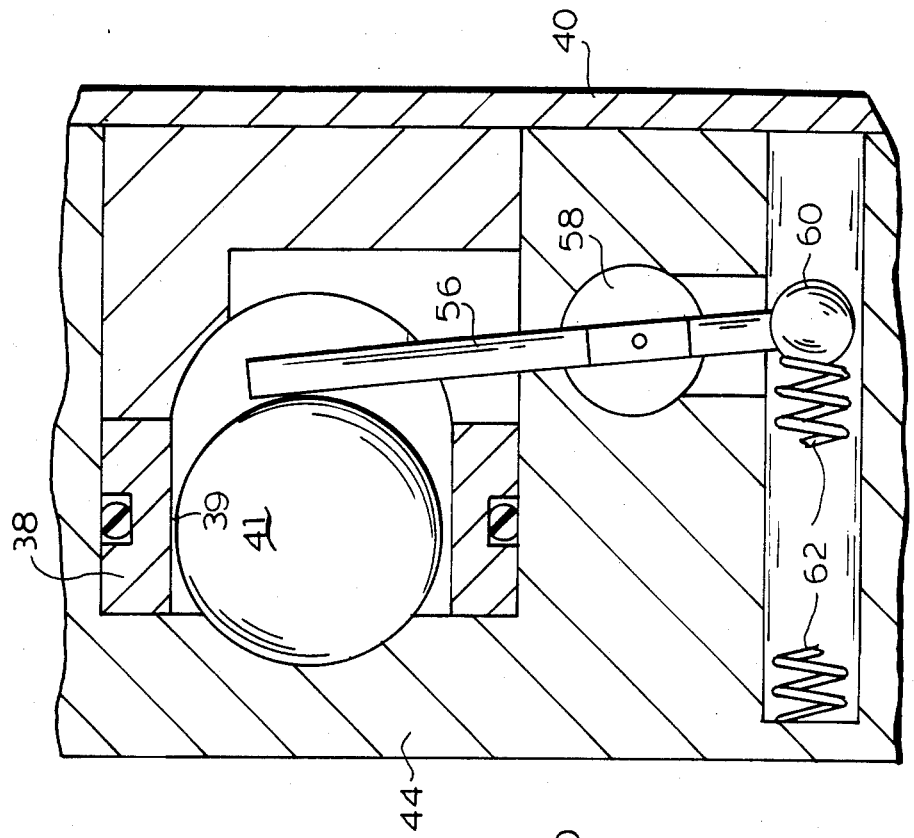
FIG. 3 is an enlarged fragmentary view of the mass and associated pin extending from a D-shaft prior to movement of the mass incident to a crash.

In the drawings, an air bag safety restraint system 8 incorporating the sensor-initiator of the invention is shown preferably mounted inside a gas generator or inflator 12. The inflator 12 is associated with the housing or cover 16 for the folded air bag 18. The air bag housing or cover 16 is made of a frangible plastic material and encloses and protects folded air bag 18 to prevent damage to the bag when it is stored and in its uninflated condition. The inflator 12 includes housing 32 containing a gas generating material 34 which may be sodium azide. This material is stable over a wide temperature range, but when ignited rapidly decomposes, releasing a large volume of nitrogen gas.

Reference is now made to sensor-initiator 10 which is designed to be mounted outside of the crush zone of a vehicle. The sensor-initiator 10 contains a pair of redundant sensors 38 which are adapted to actuate the primers 36 within the housing 40. Each sensor 38 includes a sensing mass 41 capable of limited movement within the cylinder 39 contained within the housing 40. The movement of sensing mass 41 is damped because air trapped at one end of the cylinder required to flow between the sensing mass 41 and cylinder 39 as the sensing mass moves. Movement of the mass 41 within cylinder 39 is prevented prior to mounting on the vehicle by lock arms 52. When the sensor is mounted on the vehicle, a pin or projection thereon (not shown) enters the lock pin hole 52, in the sensor-initiator 10. This pin 48 shifts the conical lock pin 54, permitting springs 55 to rotate the lock arms 52 out of the path of the sensing masses 41, thereby arming the system.

The locking arms 52 have a common connection and operate under the bias of springs 55 which urge the arms towards one another. The larger diameter of conical lock pin 54 keeps locking arms 52 apart and consequently in engagement with the masses 41. When the pin 54 is urged inwardly the smaller diameter of the conical shape of the lock pin 54 is exposed to the arms which when under the influence of the springs 55 are urged towards one another to thereby free the masses 41.

Each mass 41 is associated with a pin 56 extending from a D shaft 58. The other end of each pin 56 includes the spherical ball 60 in engagement with a biasing spring 62 to assure the interengagement of pin 56 with its associated sensing mass 41. Each D shaft 58 is provided with a flat face 64 formed in a generally cylindrically shaped exterior surface. A spring biased firing pin 66 is in alignment with the primer 36 and is maintained in a retracted position by the cylindrically shaped exterior of the D shaft 58 and is free to move when aligned with the face 64.

Figure 4:
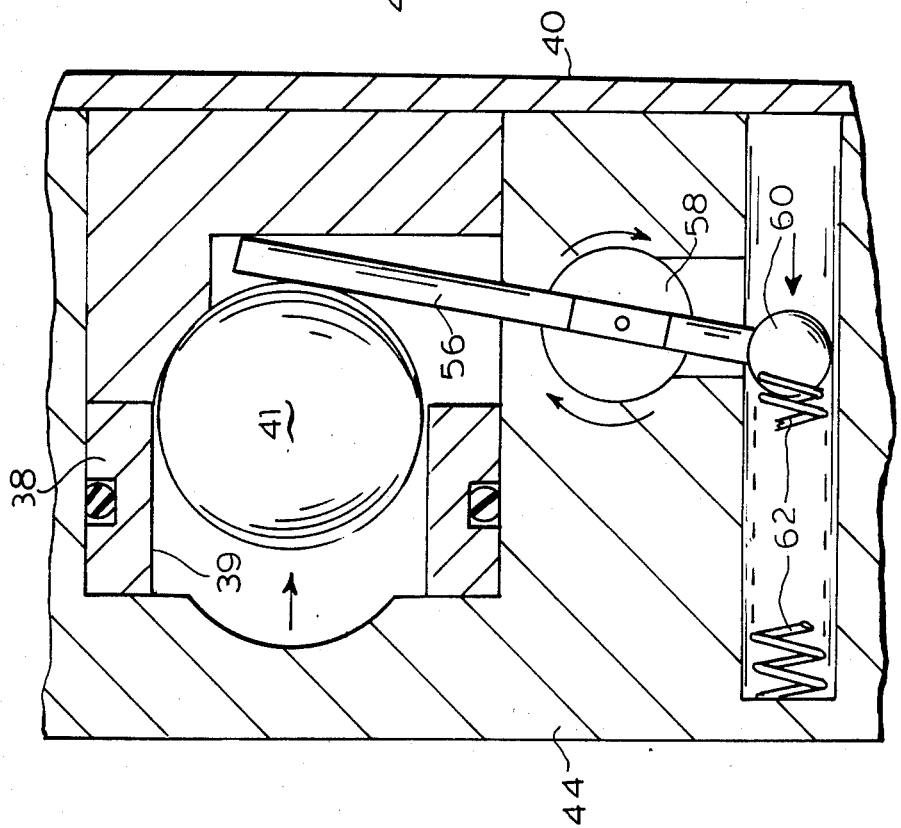
FIG. 4 is a similar view showing the mass shifted as a result of a crash and the movement of the associate pin and its D shaft.

In the event that an automobile experiences a crash, each sensing mass 41 moves to the right as shown in FIG. 4. However, this motion is resisted by the bias spring 62 acting through the pin 56 and by the air pressure differential between the left and right sides of the mass 41. This pressure is gradually relieved by the flow of air through the clearance between the mass 41 and cylinder 39. If the crash is of sufficient severity, the mass 41 will move sufficiently to the right to cause the D shaft 58 to rotate enough to clear the firing pin 66 and permit the firing pin to move passed face 64 and impact against primer 36. The impact of firing pin 66 ignites the primer 36 which then initiates the ignition of leads 68 which cooperate in initiating the burning of a gas generating material, which in turn, inflates an air bag.

Although damping by air has been illustrated here, it is also understood that other forms of damping such as by liquids or magnetically induced electric currents would also work with the proper sensing mass and housing geometry.

Thus, the present invention provides for an all mechanical air bag system in which the sensor is located outside the frontal crush zone having the correct response, and the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. In a vehicle having a safety restraint system including a pyrotechnic element for actuation thereof, a sensor operable without electrical power for igniting the pyrotechnic element, said sensor comprising:
   a housing;
   a movable sensing mass in the housing, means for substantially dampening the movement of the sensing mass when sensing the crash, said housing and mass having closely fitting surfaces providing flow of fluid in the housing between the closely fitting surfaces, movement of the mass in the housing being resisted by fluid pressure differential on opposed sides of the mass which pressure differential is gradually relieved by the flow of fluid between the closely fitting surfaces, said means for dampening utilizing the flow between closely fitting surfaces of the housing and mass, a primer, and means for igniting the primer upon predetermined motion of the sensing means.

2. The invention of claim 1, wherein the means for igniting the primer is a spring biased firing pin.

3. The invention of claim 2, including means to release the firing pin comprising a rotatable shaft, a sensing train which includes means for translating movement of the sensing mass to rotation of the shaft, and means for interconnecting the shaft and the firing pin so that the firing pin is released upon predetermined rotation of the shaft.

4. The invention in accordance with claim 1, wherein lock means are provided for locking the sensing mass and rendering the sensor safe prior to mounting the sensor on the vehicle.

5. The invention in accordance with claim 1, wherein the sensing mass is a spherical ball, a cylinder within which the ball is adapted to move, and wherein said means for dampening the movement of the ball includes the movement of the fluid escaping through the clearance between the ball and the cylinder as the ball moves therein.

6. The invention in accordance with claim 3, wherein the means for translating movement of the sensing mass to rotation of the shaft includes a radially extended pin on the rotatable shaft which is adapted to be operatively engaged by the sensing mass.

7. The invention in accordance with claim 6, wherein the radially extended pin is provided with a diametrically opposed extension extending beyond the shaft, and including a biasing spring and means on the end of the pin in engagement with the biasing spring whereby the other end of the pin is urged against the sensing mass.

8. The invention in accordance with claim 3, wherein a portion of the rotatable shaft is D-shaped, whereby clearance is provided to allow movement of the firing pin when the shaft is rotated a predetermined amount.

9. The invention in accordance with claim 1, wherein a lead is in close proximity to the primer so that it will ignite upon actuation of the primer.

10. The invention in accordance with claim 1, wherein the sensor includes a second sensing means, dampening means, primer and means means for igniting the primer to provide a redundant sensing train for sensing a crash and igniting the pyrotechnic element.

11. The invention in accordance with claim 1, wherein the motion of the movable mass is damped by the flow of a gas.

* * * * *